United States Patent [19]

Panzner et al.

[11] Patent Number: 4,655,498
[45] Date of Patent: Apr. 7, 1987

[54] SUN VISOR FOR AUTOMOTIVE VEHICLES

[75] Inventors: Rudolph Panzner, Wuppertal; Joachim Janz, Sindelfingen, both of Fed. Rep. of Germany

[73] Assignee: Gebr. Happich GmbH, Fed. Rep. of Germany

[21] Appl. No.: 863,231

[22] Filed: May 14, 1986

[30] Foreign Application Priority Data

May 24, 1985 [DE] Fed. Rep. of Germany ....... 3518751

[51] Int. Cl.$^4$ ................................................ B60J 3/02
[52] U.S. Cl. .................... 296/97 H; 16/387; 16/366; 16/302
[58] Field of Search ............ 296/97 H, 97 R; 362/144, 135, 142; 16/387, 389, 332, 334, 302, 366

[56] References Cited

U.S. PATENT DOCUMENTS

| 3,445,135 | 5/1969 | Masi | 296/97 H |
| 4,378,129 | 3/1983 | Kaiser et al. | 296/97 H |
| 4,541,663 | 9/1985 | Schwanitz et al. | 296/97 H |

FOREIGN PATENT DOCUMENTS 2703447 8/1978 Fed. Rep. of Germany .

Primary Examiner—Robert R. Song
Attorney, Agent, or Firm—Ostrolenk, Faber, Gerb & Soffen

[57] ABSTRACT

A sun visor for an automotive vehicle, having one main surface in which is defined a recess in which a housing is disposed over which a cover is pivotally mounted. One hinge pin for the cover is placed on the visor body. A second hinge pin for the cover is placed on the cover. A C-shaped strap joins the hinge pins. Each end region of the strap has two detent recesses. A respective spring biased locking element at each end region engages in one or the other respective recess at the end region to hold the strap to pivot between two detented positions. This holds the cover and also permits the cover to pivot between detented positions, which enables the cover to be held closed against the one main surface, outwardly projecting from that surface or fully opened orientation at that surface. Details of both spring arrangements for cooperating with the detent recesses are disclosed. The side of the cover exposed at a fully open orientation carries a mirror.

22 Claims, 6 Drawing Figures

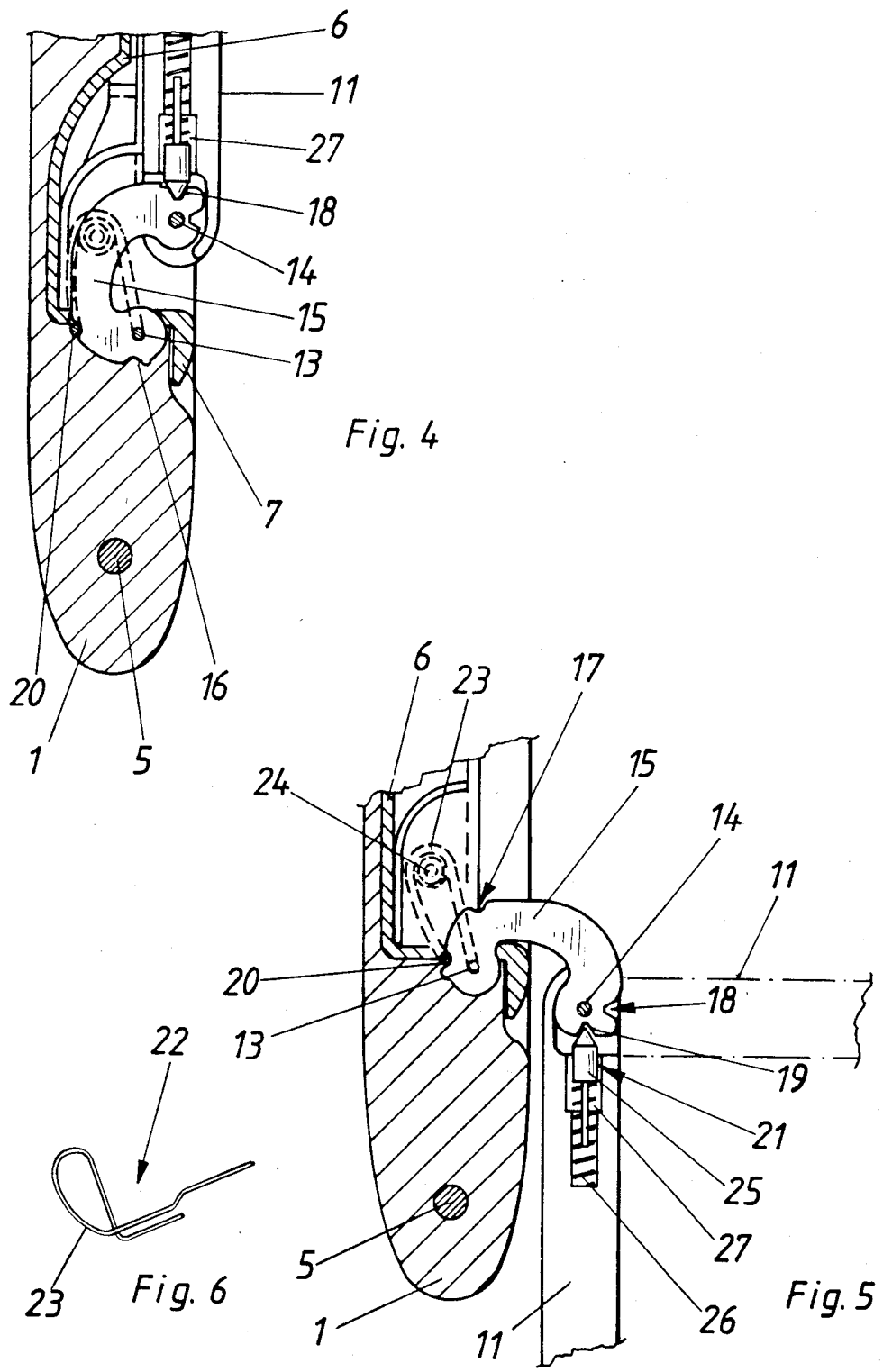

SUN VISOR FOR AUTOMOTIVE VEHICLES

BACKGROUND OF THE INVENTION

The present invention relates to a sun visor for automotive vehicles and more particularly to a pivoted cover on the visor body. The sun visor has a flat sun-visor body of approximately rectangular surrounding contour, which is provided in one of its two main surfaces with a recess within which a box-shaped housing is inserted. The housing has a cover which is pivoted to it, and the cover is equipped on one side with a mirror.

Federal Republic of Germany Patent No. 27 03 447 shows a sun visor which has a mirror recessed in the sun-visor body and a cover flap over the mirror. That known sun visor has various defects. The mirror frame protrudes from the plane of the sun-visor body and defines hard edges, which are against some safety requirements. The cover flap is connected pivotally to the upper edge of the mirror frame and can swing open only by 90°. Therefore, when the mirror is visible, which can occur only when the cover flap is open, the free front edge of the mirror flap extends into the passenger space of the car and can pierce an object upon sudden braking or an accident, thus resulting in increased danger of injury to the occupants of the vehicle.

Federal Republic of Germany Published Application OS No. 32 22 194 shows a sun visor for automotive vehicles in which the swingable cover is equipped with a mirror. The cover can be swung by 180°. When the cover is in its open position, it hangs down freely and is not secured against shaking or swinging. The user of the mirror may then be forced to hold the cover and mirror fast if the mirror is to be used during travel. It is furthermore not readily evident from that publication how the cover is pivotally attached to the sun-visor body.

SUMMARY OF THE INVENTION

In a sun visor with a mirror secured on a surface of the pivotal cover of the visor body, the object of the present invention is to pivot the cover to the sun-visor body to not only permit a 180° swing of the cover but in addition to assure that, in its closed position, the cover terminates flush with the corresponding main surface of the sun-visor body and the cover is held immovable on the sun-visor body in both the closed and the open positions. Furthermore, the connection of the cover to the sun-visor body should satisfy safety requirements as well as the demands made from an aesthetic standpoint on a sun visor in a vehicle.

The present invention concerns a hinge for the pivotable cover. Typically, there are two such hinges, one at each end of the cover. One could suffice for a cover. The disclosure details one such hinge. The hinge of the invention permits an angle of opening of 90° or a complete reversal of the cover, opening it by 180°. Each hinge uses two hinge pins. One hinge pin is arranged on the housing and the other hinge pin is on the cover. The hinge pins are separated and are connected to each other by a strap which is of approximately C shape. The strap is provided at each of its end regions with two detent openings or grooves arranged along the outside of the strap at the end regions. Into these openings, spring-loaded locking members engage. These lock the strap around the respective one of the two hinge pins as a function of the angle of opening of the cover and selectively hold the cover in the open or closed end positions.

This makes it possible to arrange the cover recessed within the housing in the sun-visor body, so that the outer surface of the cover is flush with the outer surface of the sun-visor body. Nevertheless, while the cover can be swung by 180°, it can be locked securely in its end positions. The invention also improves the safety conditions since there are no longer any protruding edges and corners in the closed end position of the cover. Further, the recessed arrangement of the cover as well as the possibility of concealing the hinge improves the overall aesthetic appearance of the new sun visor.

In one particularly preferred embodiment of the invention, one locking member is arranged on the housing and the other locking member is arranged on the cover. The locking member springs which act on the locking members and/or the detent recesses are adapted to each other so that when the cover is moved from the one end position into the other, first a 90° swing of the strap around the hinge pin provided on the housing takes place. In this way, the course of movement of the cover is cleanly controlled and it is assured that the strap can slide over an upwardly protruding housing edge or frame molding.

In accordance with another preferred feature of the invention, the hinge pin which is arranged on the housing includes one arm that is comprised of a length of spring wire that is bent into the shape of a hairpin and includes another arm forming a locking member which engages in the adjacent detent recesses at the end region of the strap. The arched region of the length of spring wire which connects the arms is bent up from the arms at a right angle and is developed as a mounting eye for the hinge pin. This has the advantage that the hinge pin and the locking member can consist of a single structural part, which is simple and inexpensive to manufacture.

In accordance with a further development of the invention, the cover has a blind hole into which a coil compression spring and the respective locking member developed as a detent pin are inserted.

Finally, in another development of the invention, the box-shaped housing is developed with a surrounding frame molding which terminates approximately flush with the corresponding outer surface of the sun-visor body. The hinge pin on the housing is arranged concealed behind the frame molding. The hinge pin on the cover is also concealed on a rear edge region of the cover.

Other objects and features of the invention will be explained below with reference to the drawings.

BRIEF DESCRIPTION OF THE DRAWINGS

FIG. 4 is a section similar to that of FIG. 3 of a hinge region of the cover, shown closed;

FIG. 5 is the same section, shown with the cover opened; and

FIG. 6 shows a detail of the invention.

DESCRIPTION OF A PREFERRED EMBODIMENT

Figure 1:
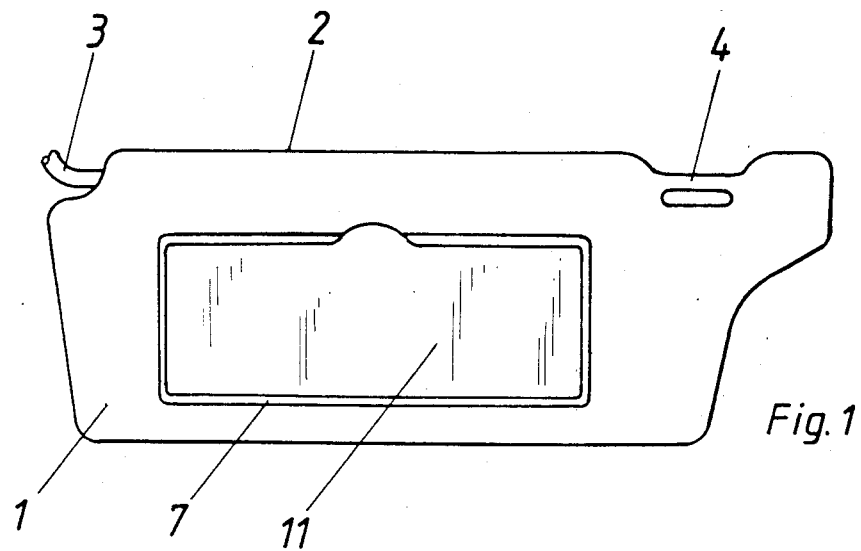
FIG. 1 is a plan view of a sun visor.
Figure 3:
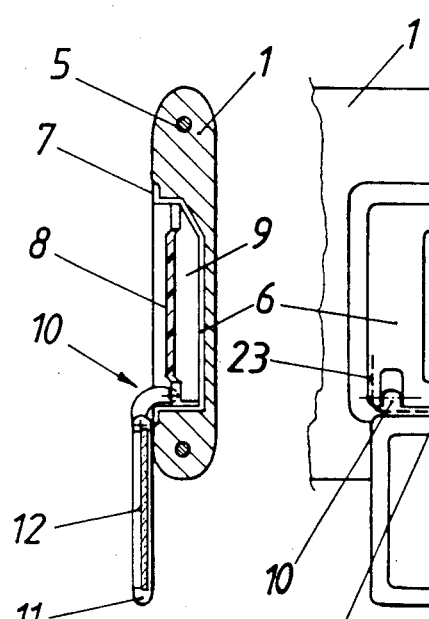
FIG. 3 is a section along the line III—III of FIG. 2.
Figure 2:
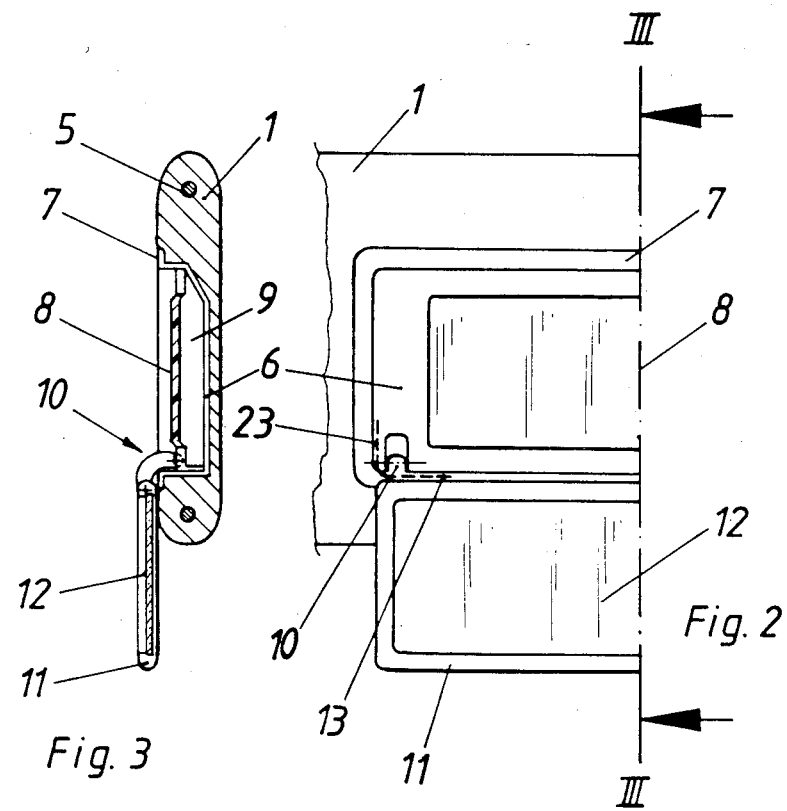
FIG. 2 is a partial view of the sun visor of FIG. 1, with the cover removed.

A sun visor according to the invention includes an approximately rectangular, flat sun-visor body 1 having a swivel mount at one end region of the upper longitudinal edge 2. A mounting housing (not shown) on the vehicle body receives a sun-visor shaft 3 secured at the sun-visor body. An outer-support shaft 4 is arranged at the other outer end region of the same longitudinal edge 2, and it is detachably insertable into an outer support housing (not shown) on the vehicle body. The sun-visor body 1 is made of foam plastic and is stiffened by a wire frame 5 embedded in the body and extending around it.

The sun-visor body 1 has a main surface, which faces the user in the position of use. That surface is formed with a recess having a housing 6 inserted into it. That housing is developed on the outside with a surrounding frame molding 7 which terminates flush with the main surface of the sun-visor body 1. The housing 6 is preferably provided with a lighting device (not shown). The parts of the lighting device are arranged in a housing chamber 9 which is divided off by a pane 8 of light-transmitting material.

At the lower edge of the housing 6, there are two hinges 10. A cover 11 is hingedly attached there and is swingable downward 180° from a position covering the housing 6 through a 90° tilt position projecting out and then fully downward. On its side facing the viewer in the downward-swung position of the cover 11, the cover 11 carries a mirror 12.

Each hinge 10 of the cover 11 comprises two hinge pins 13 and 14. The first pin 13 is arranged on the housing 6, and the second pin 14 is on the cover 11. The hinge pins 13 and 14 are connected to each other by a strap 15 which is of approximately C shape. In the region of its free ends, the strap 15 has mounting holes for the hinge pins 13 and 14. The strap 15 is provided at each of its end regions with two detent recesses 16, 17 and 18, 19, each defined on the outside of the strap. In one of the detent recesses 16 or 17 at one end region, and depending upon the position of swing of the strap 15, there is engaged a first spring-loaded locking member 20, which is arranged on the housing 6. In one of the detent recesses 18 and 19 at the other end region, depending on the opening angle of the cover 11, there is engaged a second spring-loaded locking member 21, which is arranged on the cover.

The hinge pin 13 has one arm of a length of spring wire 22, which is bent into the shape of a hairpin (FIG. 6). The hinge pin arm 22 extends in a direction generally across the visor body generally in the plane of the body for enabling the cover to swing correctly. The other arm of the hinge pin 13 forms the locking member 20. The arched region of the length of spring wire 22, which connects the arms together, is bent upward at a right angle from the arms of the hinge pin and is developed as a mounting eye 23 which can be placed around a mounting pin 24 that is provided in the housing 6.

The hinge pin 14 comprises a round bolt, which is secured against axial displacement by rivet heads developed on it, for instance. That pin 14 extends across the cover generally in the plane thereof and generally parallel to the arm 22 of the pin 13. The locking member 21 is developed as a detent pin 25 which is spring-loaded by a coil compression spring 26. The detent pin 25 and the coil compression spring 26 are arranged in a blind hole 27 which is formed in the cover 11 and which may, as shown in the drawing, be reduced in size stepwise. The coil compression spring 26 has a much harder spring characteristic than the arm of the length of spring wire 22 which forms the locking member 20.

When the cover 11 is to be moved from its closed position (FIG. 4) into its open position, the following takes place. The cover 11 is grasped at its upper edge and is swung downward. The locking member 20, which is acted on by a weaker spring force, slides out of the detent recess 17 and, after a cover opening angle of 90°, as shown in dot-dash line in FIG. 5, enters the detent recess 16. During the first part of the swinging path, therefore, the strap 15 turns around the hinge pin 13. As soon as the strap 15 has reached the position shown in FIG. 5, the strap 15 is prevented from swinging further by stops (not shown) or simply by resting against the edge of the frame molding 7. Upon continuation of the swinging movement of the cover, the locking member 21 now slides out of the detent recess 18 and the cover 11 is swung a further 90° around the hinge pin 14, whereupon the locking member 21 engages in the detent recess 19. Since the strap 15 is now locked by the locking member 20 while the cover 11 is locked by the locking member 21, the cover 11 is in a stable open position.

In bringing the cover 11 into the closed position, the course of movement takes place in reverse. The cover 11 locked together with the strap 15 by the locking member 20 is first swung around the hinge pin 13. Then the cover alone is swung further around the hinge pin 14. The cover 11 is reliably held in the closed position by the locking members 20, 21, which are engaged in the detent recesses 17 and 18.

As can be noted from the drawings, the hinge pins 13 and 14 lie on the front side of the housing, and, in the closed position of the cover, the convex side of the large arc of the C-shaped strap 15 is directed toward the bottom of the housing 6. The hinge pin 13 is arranged behind the frame molding 7, so that it is necessary to provide the housing 6 with downward-widened swinging space or with slots in order to permit the strap 5 to swing unimpeded.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A sun visor for automotive vehicles having a generally flat body with two opposite main surfaces; a recess in one of the main surfaces including therein a housing;

a cover pivotally supported to the housing, the pivotal support for the cover comprising a first hinge pin supported to the housing and extending generally in the plane of the sun-visor body for enabling the cover to pivot with respect to the one surface of the body; the pivotal connection further comprising a second hinge pin on the cover and extending generally in the plane of the cover for enabling the cover to be pivoted around the second hinge pin with respect to the surface of the body; the first and second hinge pins being separated from each other;

a strap joined to the first and second hinge pins and extending between them; the strap having respective first and second end regions in the vicinity of the first and second hinge pins; the first end region of the strap having first and second detent means at spaced apart locations around the first end region; the second end region of the strap having third and fourth detent means at spaced apart locations around the second end region;

first locking means on the housing for selectively locking to one of the first and second detent means for holding the strap pivoted around the first hinge pin at positions defined by the cooperation between the first locking means and the first and second detent means, wherein the first locking means engages a respective one of the first and second detent means as a function of a respective pivot angle of the strap around the first hinge pin; second locking means on the cover for selectively locking to one of the third and fourth detent means for holding the cover pivoted around the second hinge pin at positions defined by the cooperation between the second locking means and the third and fourth detent means, wherein the second locking means engages a respective one of the third and fourth detent means as a function of the pivot angle of the cover around the second hinge pin.

2. The sun visor of claim 1, wherein the first detent means is so placed on the strap that when the first locking means engages the first detent means, the strap is at a pivot position more inwardly of the housing; and the second detent means is so placed on the strap that when the first locking means engages the second detent means, the strap is at a pivot position where the second end region thereof projects outwardly of the housing and of the first surface of the visor body.

3. The sun visor of claim 2, wherein the cover has opposite third and fourth surfaces; the detent means are so placed on the strap that when the second locking means is in engagement with the third detent means, while the first detent means is being engaged by the first locking means, the cover is oriented to be in the housing and generally parallel to the first surface of the housing and the third surface of the cover is exposed to view from above the first surface; and when the second locking means is in engagement with the third detent means, while the first locking means is in engagement with the second detent means, the strap is so oriented and the cover is so oriented that the cover is projecting outwardly of the housing and of the first surface of the visor body; and when the second locking means is in engagement with the fourth detent means, while the first locking means is in engagement with the second detent means, the strap is so oriented and the cover is so oriented that the cover extends generally parallel to the first surface of the housing but the cover is oriented so that the opposite fourth surface thereof is exposed to view.

4. The sun visor of claim 3, wherein the first and second detent means are so placed that the strap is pivoted over an angle of approximately 90° around the first hinge pin between the engagement between the first locking means and the first detent means and the engagement between the first locking means and the second detent means.

5. The sun visor of claim 3, wherein the third and fourth detent means are so placed that the cover is pivoted over an angle of approximately 90° around the second hinge pin between the engagement between the second locking means and the third detent means and the engagement between the second locking means and the fourth detent means.

6. The sun visor of claim 5, wherein the first and second detent means are so placed that the strap is pivoted over an angle of approximately 90° around the first hinge pin between the engagement between the first locking means and the first detent means and the engagement between the first locking means and the second detent means.

7. The sun visor of claim 3, wherein a mirror is disposed on the second side of the cover.

8. The sun visor of claim 7, wherein each of the first, second, third and fourth detent means comprises a respective recess in the respective end region of the strap and each of the locking means comprises a respective spring-loaded locking member, with the first spring-loaded locking member being supported on the housing and the second spring-loaded locking member being supported on the cover, and the spring-loaded locking members being engageable selectively in one of the respective detent recesses.

9. The sun visor of claim 8, wherein the spring-loading of the first locking member and the spring-loading of the second locking member are adapted to each other that upon a force being applied to the cover to move the cover from one orientation to another, the strap first pivots around the first hinge pin between the positions defined by the first and second detent recesses and only thereafter pivots around the second hinge pin between the positions defined by the third and fourth detent recesses as continued force is applied to the cover to pivot the same in a particular direction.

10. The sun visor of claim 1, wherein the third and fourth detent means are so placed that the cover is pivoted over an angle of approximately 90° around the second hinge pin between the engagement between the second locking means and the third detent means and the engagement between the second locking means and the fourth detent means.

11. The sun visor of claim 10, wherein the first and second detent means are so placed that the strap is pivoted over an angle of approximately 90° around the first hinge pin between the engagement between the first locking means and the first detent means and the engagement between the first locking means and the second detent means.

12. The sun visor of claim 1, wherein the sun-visor body is a flat body with an approximately rectangular surrounding contour which defines the first and second main surfaces.

13. The sun visor of claim 1, wherein the strap has an approximately C-shape with a convexly rounded side and the strap is oriented so that its convexly rounded side faces inwardly of the recess when the strap is oriented in the recess.

14. The sun visor of claim 1, wherein each of the first, second, third and fourth detent means comprises a respective recess in the respective end region of the strap and each of the locking means comprises a respective spring-loaded locking member, with the first spring-loaded locking member being supported on the housing and the second spring-loaded locking member being supported on the cover, and the spring-loaded locking members being engageable selectively in one of the respective detent recesses.

15. The sun visor of claim 14, wherein the spring-loading of the first locking member and the spring-loading of the second locking member are adapted to each other that upon a force being applied to the cover to move the cover from one orientation to another, the strap first pivots around the first hinge pin between the positions defined by the first and second detent recesses and only thereafter pivots around the second hinge pin between the positions defined by the third and fourth detent recesses as continued force is applied to the cover to pivot the same in a particular direction.

16. The sun visor of claim 14, wherein the first hinge pin comprises a length of spring wire which is bent intermediate its length to define a loop and thereby to define arms on both sides of the loop, and one arm of the length of spring wire defining the hinge pin and the other arm of the length of spring wire defining the first locking member for engaging into the first and second detent recesses.

17. The sun visor of claim 16, wherein the arms of the spring wire extend in a direction generally across the sun-visor body while the loop portion of the spring wire is bent upwardly for defining a mounting eye for the spring wire, and means on the housing for receiving and supporting the spring wire at the mounting eye.

18. The sun visor of claim 1, wherein the second locking means comprises a detent pin supported on the cover and a spring acting on the detent pin to push the detent pin toward the respective one of third and fourth detent recesses then opposite the detent pin.

19. The sun visor of claim 18, wherein the cover includes a hole defined in it in which the detent pin and the spring for acting upon the detent pin are disposed.

20. The sun visor of claim 1, wherein the housing comprises a frame molding which terminates outwardly of the recess approximately flush with the main surface of the visor body.

21. The sun visor of claim 20, wherein the first hinge pin on the housing is arranged inwardly of the housing and of the recess with respect to the main surface of the visor body.

22. The sun visor of claim 21, wherein the second hinge pin on the cover is arranged at an edge region of the cover and the strap is so shaped that the second hinge pin is also disposed inside the recess and the frame molding.

* * * * *